(12) United States Patent
Bala et al.

(10) Patent No.: US 9,043,651 B2
(45) Date of Patent: May 26, 2015

(54) SYSTEMATIC FAILURE REMEDIATION

(75) Inventors: Vasanth Bala, Rye, NY (US); Niyu Ge, Chappaqua, NY (US); Ea-Ee Jan, Ardsley, NY (US); Darrell C. Reimer, Tarrytown, NY (US); Lakshminarayanan Renganarayana, Elmsford, NY (US); Xiaolan Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 13/565,139

(22) Filed: Aug. 2, 2012

(65) Prior Publication Data

US 2013/0339779 A1 Dec. 19, 2013

Related U.S. Application Data

(63) Continuation of application No. 13/562,913, filed on Jul. 31, 2012.

(60) Provisional application No. 61/660,283, filed on Jun. 15, 2012.

(51) Int. Cl.
*G06F 11/00* (2006.01)
*G06F 11/14* (2006.01)

(52) U.S. Cl.
CPC ........ *G06F 11/1433* (2013.01); *G06F 2201/83* (2013.01)

(58) Field of Classification Search
USPC .......................................................... 714/37
See application file for complete search history.

(56) References Cited

U.S. PATENT DOCUMENTS

| | | | |
|---|---|---|---|
| 2006/0265431 A1* | 11/2006 | Yamato et al. | 707/201 |
| 2009/0327809 A1 | 12/2009 | Joy et al. | |
| 2010/0223500 A1 | 9/2010 | Heilmann et al. | |
| 2011/0302462 A1 | 12/2011 | Roshen et al. | |
| 2011/0320876 A1* | 12/2011 | Klein et al. | 714/38.1 |
| 2012/0226938 A1 | 9/2012 | Sakaguchi et al. | |

OTHER PUBLICATIONS

U.S. Appl. No. 13/562,913, Office Action, dated Mar. 3, 2014, 12 pages.

* cited by examiner

*Primary Examiner* — Sarai Butler
(74) *Attorney, Agent, or Firm* — Louis J. Percello; Hoffman Warnick LLC

(57) ABSTRACT

Aspects of the present invention provide a tool for analyzing and remediating an update-related failure. In an embodiment, a failure state of a computer system that has been arrived at as a result of an update is captured. A semantic diff that includes the difference between the failure state and at least one of an original state or a completion state is then computed. This semantic diff is transformed into a feature vector format. Then the transformed semantic diff is analyzed to determine a remediation for the update. Failure and/or resolution signatures can be constructed using the semantic diff and contextual data, and these signatures can be used in comparison and analysis of failures and resolutions.

20 Claims, 6 Drawing Sheets

SYSTEMATIC FAILURE REMEDIATION

CROSS-REFERENCE TO RELATED APPLICATIONS

This application is a Continuation of currently pending U.S. patent application Ser. No. 13/562,913 filed on Jul. 31, 2012, which claims the benefit of U.S. Provisional Application No. 61/660,283, filed on Jun. 15, 2012, both of which are hereby incorporated herein by reference.

TECHNICAL FIELD

The subject matter of this invention relates generally to computer systems fault resolution. More specifically, aspects of the present invention provide a tool for resolving failures due to an update to a computer system.

BACKGROUND

The information technology environment of today is a rapidly changing landscape. Technologies that are "cutting edge" one day can soon become obsolete. Similarly, hardware and software configurations for managing information can change significantly over time. For example, it may be accepted practice during one period of time to operate with computer systems in a client-server-type configuration. Advances in technology, such as more powerful desktop computers replacing dumb terminals, for example, could rapidly lead to a transition from client-server to a peer-to-peer-type configuration. Then perhaps, advances, such as an improvement in networking and/or the development or improvement of virtual server environments, could lead to a new type of client-server-type environment, such as cloud computing.

One challenge in keeping up with the ever changing information technology landscape is how to update information technology components from one configuration to a desired new configuration in such a way that they operate correctly. Often, incompatibilities between a current configuration and the configuration to which the components are to be updated can cause an operation associated with the update to fail. In case of such a failure, a human technician is currently utilized to resolve the failure.

SUMMARY

The inventors of the present invention have discovered that the current way of dealing with update-related failures can be improved. For example, the manual, ad hoc, case by case failure resolution that is currently practiced is inefficient. This is, in part, because it relies on the expertise of the particular technician that is attempting to resolve the failure. If this technician has never encountered a failure of this sort, the technician may have very little guidance in resolving the failure. This difficulty can exist for one particular inexperienced technician even if the failure is one that has been experienced frequently by other technicians.

In general, aspects of the present invention provide a tool for analyzing and remediating an update-related failure. In an embodiment, a failure state of a computer system that has been arrived at as a result of an update is captured. A semantic diff that includes the difference between the failure state and at least one of an original state or a completion state is then computed. This semantic diff is transformed into a feature vector format. Then the transformed semantic diff is analyzed to determine a remediation for the failure. Failure and/or resolution signatures can be constructed using the semantic diff and contextual data, and these signatures can be used in comparison and analysis of failures and resolutions.

A first aspect of the invention provides a method for remediating an update-related failure, comprising: capturing a failure state of a computer system arrived at as a result of the update; computing a semantic diff, the semantic diff being a difference between the failure state and at least one of an original state or a completion state; transforming the semantic diff into a feature vector format; and analyzing the transformed semantic diff to determine a remediation for the update-related failure.

A second aspect of the invention provides a system for remediating an update-related failure, comprising at least one computer device that performs a method, comprising: capturing a failure state of a computer system arrived at as a result of the update-related failure; computing a semantic diff, the semantic diff being a difference between the failure state and at least one of an original state or a completion state; transforming the semantic diff into a feature vector format; and analyzing the transformed semantic diff to determine a remediation for the update-related failure.

A third aspect of the invention provides a computer program product stored on a computer readable storage medium, which, when executed performs a method for remediating an update-related failure, comprising: capturing a failure state of a computer system arrived at as a result of the update; computing a semantic diff, the semantic diff being a difference between the failure state and at least one of an original state or a completion state; transforming the semantic diff into a feature vector format; and analyzing the transformed semantic diff to determine a remediation for the failure.

A fourth aspect of the invention provides a method for deploying an application for remediating an update-related failure, comprising: providing a computer infrastructure being operable to: capture a failure state of a computer system arrived at as a result of the update-related failure; compute a semantic diff, the semantic diff being a difference between the failure state and at least one of an original state or a completion state; transform the semantic diff into a feature vector format; and analyze the transformed semantic diff to determine a remediation for the failure.

Still yet, any of the components of the present invention could be deployed, managed, serviced, etc., by a service provider who offers to implement the teachings of this invention in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
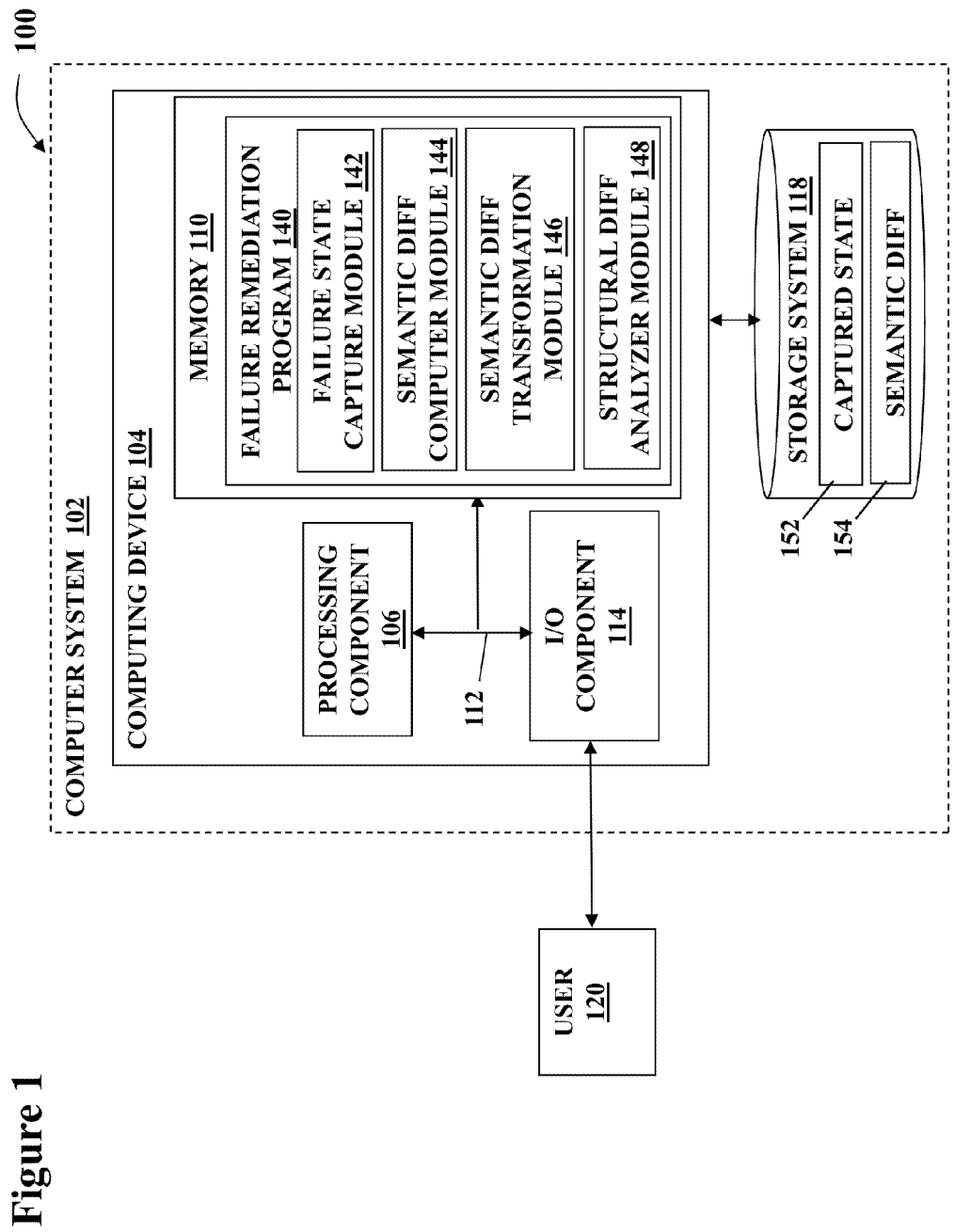
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, aspects of the present invention provide a tool for analyzing and remediating an update-related failure. In an embodiment, a failure state of a computer system that has been arrived at as a result of an update is captured. A semantic diff that includes the difference between the failure state and at least one of an original state or a completion state is then computed. This semantic diff is transformed into a feature vector format. Then the transformed semantic diff is analyzed to determine a remediation for the failure. Failure and/or resolution signatures can be constructed using the semantic diff and contextual data, and these signatures can be used in comparison and analysis of failures and resolutions.

We refer, herein, to any change to a system as an update to the system. Examples of such updates can include, but are not limited to, changes due to migration of software components, changes due to upgrades, patching of software components, or the like.

Turning to the drawings, FIG. 1 shows an illustrative environment 100 for remediating an update-related failure. To this extent, environment 100 includes a computer system 102 that can perform a process described herein in order to remediate an update-related failure. In particular, computer system 102 is shown including a computing device 104 that includes a failure remediation program 140, which makes computing device 104 operable to remediate an update-related failure by performing a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as failure remediation program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, failure remediation program 140 can manage a set of interfaces (e.g., graphical user interface(s), application program interface, and/or the like) that enable human and/or system users 120 to interact with failure remediation program 140. Users 120 could include system administrators and/or clients utilizing resources in a virtual data center environment 200 (FIG. 2), among others. Further, failure remediation program 140 can manage (e.g., store, retrieve, create, manipulate, organize, present, etc.) the data in storage system 118, including, but not limited to a captured state 152 and/or semantic diff 154, using any solution.

In any event, computer system 102 can comprise one or more computing devices 104 (e.g., general purpose computing articles of manufacture) capable of executing program code, such as failure remediation program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, failure remediation program 140 can be embodied as any combination of system software and/or application software. In any event, the technical effect of computer system 102 is to provide processing instructions to computing device 104 in order to remediate an update-related failure.

Further, failure remediation program 140 can be implemented using a set of modules 142-148. In this case, a module 142-148 can enable computer system 102 to perform a set of tasks used by failure remediation program 140, and can be separately developed and/or implemented apart from other portions of failure remediation program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of failure remediation program 140 fixed thereon (e.g., one or more modules 142-148). However, it is understood that computer system 102 and failure remediation program 140 are only representative of various possible equivalent computer systems that may perform a process described herein. To this extent, in other embodiments, the functionality provided by computer system 102 and failure remediation program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, failure remediation program 140 enables computer system 102 to remediate an update-related failure. To this extent, failure remediation program 140 is shown including a failure state capture module 142, a semantic diff computer module 144, a semantic diff transformation module 146, and a structural diff analyzer module 148.

Computer system 102, executing failure state capture module 142, captures a failure state 152 of a computer system that has undergone a failure related to an update. This update can include a migration of a physical server to a virtual server in a cloud environment, a migration from one cloud environment to another cloud environment, a migration from one physical computer device to another physical computer device, upgrade or patching of one or more software components, or any other like updates. In any case, due to differences in the source and target configurations, certain operations may need to be performed in the course of the update. These operations can include uninstalling an operating system on the source, reinstalling an operating system on the destination, uninstalling an application program on the source, reinstalling an application program on the destination, modifying a management agent that manages a software stack, changing an IP address, patch the source operating system and/or other software components, or another environmental setting, etc. Sometimes such changes are not successfully performed to completion and/or cause instability in other areas of the computer system being updated, causing a failure condition to be generated for the operation.

Figure 2:
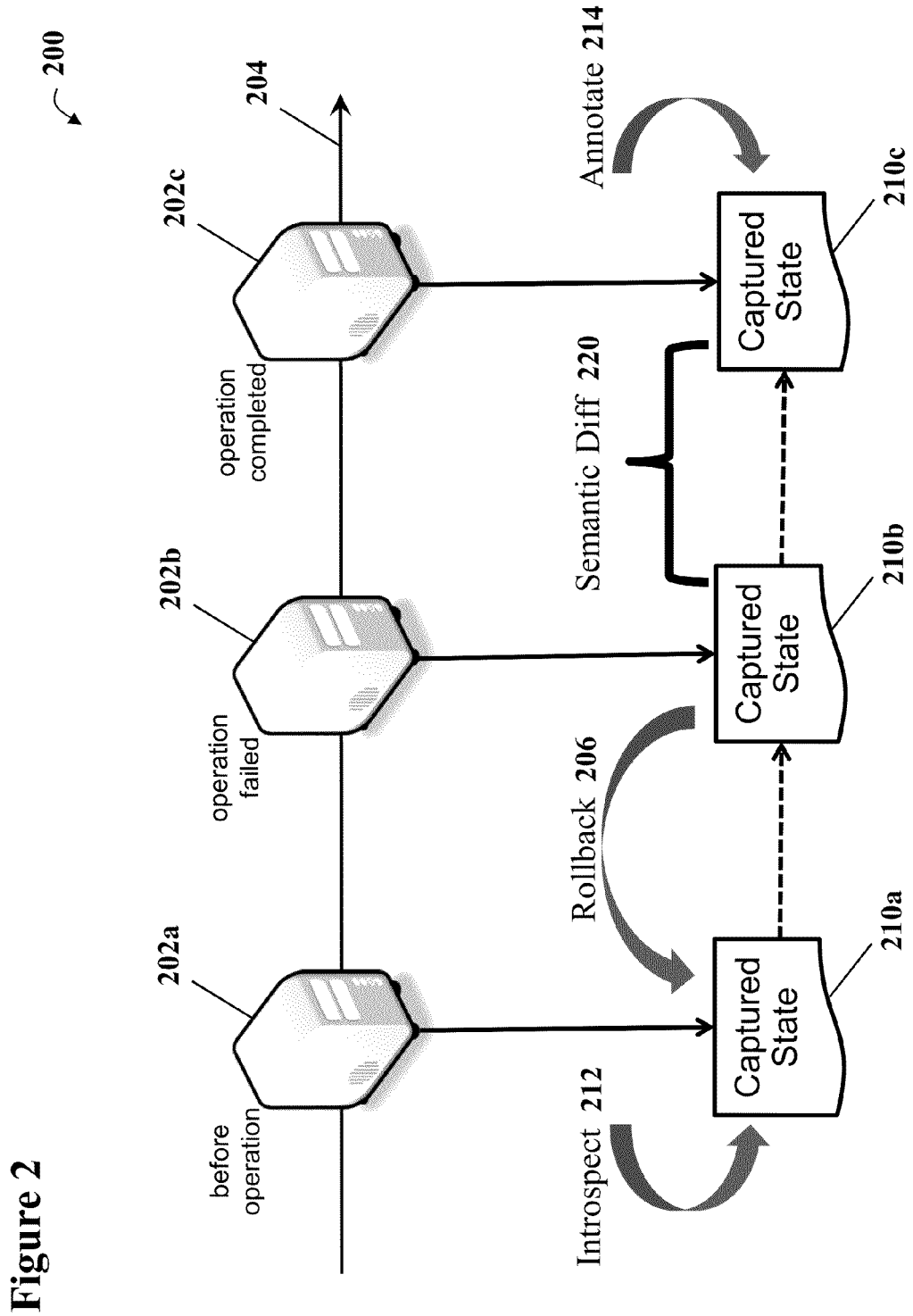
FIG. 2 shows an update-related failure and associated tasks according to embodiments of the invention.

Referring now to FIG. 2, an update-related failure 200 according to embodiments of the invention is shown. As shown in FIG. 2, in conjunction with FIG. 1, three stages 202a-c in a failure event are demonstrated. In particular, failure stage 202b occurs upon a determination that an update-related failure has occurred, such as the failure of a particular operation in the migration. At the time of the failure of stage 202b, a captured state 210b of the computer system can be captured. For example, in the case of a migration to a cloud environment or another migration in which resources are plentiful, captured state 210b could be a snapshot of the entire computer system. Such a snapshot could enable a user 120 who is overseeing the operation to rollback 206 the computer system to an initial stage 202a, utilizing a captured state 210a that was captured before the operation was performed. In contrast, in a physical device to physical device migration, the ability to perform a full capture may be limited. In this case, or other similar cases, captured state 210b may be only an index of the computer system at the time of failure 202b. User 120 can also introspect 212 the captured state, which enables an analysis of the system at the time failure stage 202b occurred. Whatever the case, either or both of captured state 210a or captured state 210b can be stored in a database, such as storage system 118 (FIG. 1) for later use.

In any event, once captured state 210b corresponding to failure stage 202b has been captured, semantic diff computer module 144, as executed by computer system 102, can compute a semantic diff 220 based on the captured state 210b. This computation can be made by comparing captured state 210b with captured state of initial stage 210a, or by first taking a captured state 210c from a completion state 202c, and comparing it with the captured state 210b. This captured state 210c could include an annotation 214 of a resolution for the failure. Captured state 210c can then be compared with the captured state 210b corresponding to failure stage 202b.

Figure 3:
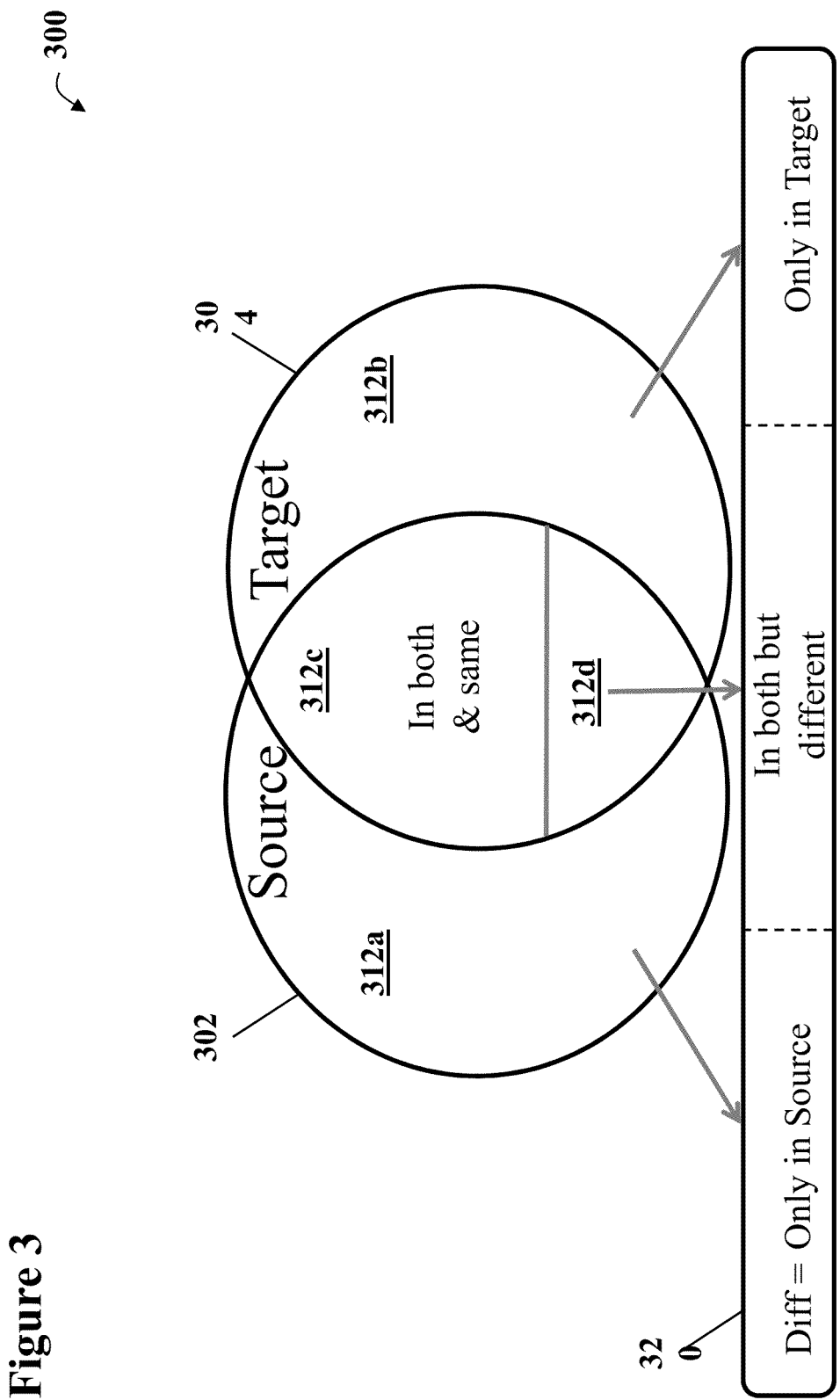
FIG. 3 shows a Venn diagram illustrating the various components of a semantic diff according to embodiments of the invention.

Turning now to FIG. 3, a Venn diagram 300 illustrating components of the computed semantic diff 154 is shown. As illustrated in FIG. 3 in conjunction with FIG. 2, a source region 302 that corresponds to captured state 210b from failure stage is shown. Also shown is a target region 304 that corresponds to captured state 210c from completion stage 202c. The intersection of source region 302 and target region 304 creates four distinct subregions 312a-d. Region 312a contains information that is in source region 302 only and therefore in captured state 210b corresponding to failure stage 202b but not in target region 304. Similarly, region 312b contains information that is not in source region 302 but is in target region 304 only and therefore in captured state 210c corresponding to completion stage 202c. Both of these sources of information, source only and target only, can be valuable for analysis of an update related failure, and hence are captured as a part of the Diff 310. Similarly, the captured states 210a and 210b can be used to compute the diff and the its source only and target only components.

In contrast, regions 312c and 312d contain information that is in both source region 302 and therefore in captured state 210b corresponding to failure stage 202b and also in target region 304 and therefore in captured state 210c corresponding to completion stage 202c. The information in region 312c is the same in both source region 302 and target region 304 and is therefore not different between captured state 210b and 210c. As such, there is no need for this information to be included in diff 310. However, the information in region 312c is information that is in each of source region 302 and target region 304, but has been changed between the two. This information could, for example, include files, settings, etc., which are present in both captured state 210b and captured state 210c, but which should have had changes made to the contents thereof for a successful completion of the operation but which were not made due to an update-related failure. To this extent, information in this region 312d has been changed between captured state 210b and captured state 210c and should therefore be included in Diff 320. Similarly, the captured states 210a and 210b can be used to compute the diff and its in both but different and in both and same components.

Referring back to FIG. 1, semantic diff transformation module 146, as executed by computer system 102, can transform semantic diff 154 that was computed by semantic diff computer module 144, into a feature vector format. This format can allow the nature of future analysis to be changed from a linguistic "word search" based matching to one that is based on identification of feature components within semantic diff 154. This change in nature can help make the comparison of one semantic diff 154 with another more precise. Specifically, semantic diffs 154 associated with different computer systems could have corresponding feature components with different linguistic naming conventions. As such, an "exact match" type of linguistic comparison would discard two such semantic diffs 154 as being non-equivalent. Similarly, a linguistic approach using a "fuzzy" matching technique could yield significantly more false positives than useful matches. In contrast, the feature vector format into which the semantic diff 154 of the present invention is transformed provides a standardized template for recording the constituent components of semantic diff 154, regardless of the linguistic naming conventions. To this extent, the transformation could be into any format that accomplishes this goal.

Figure 4:
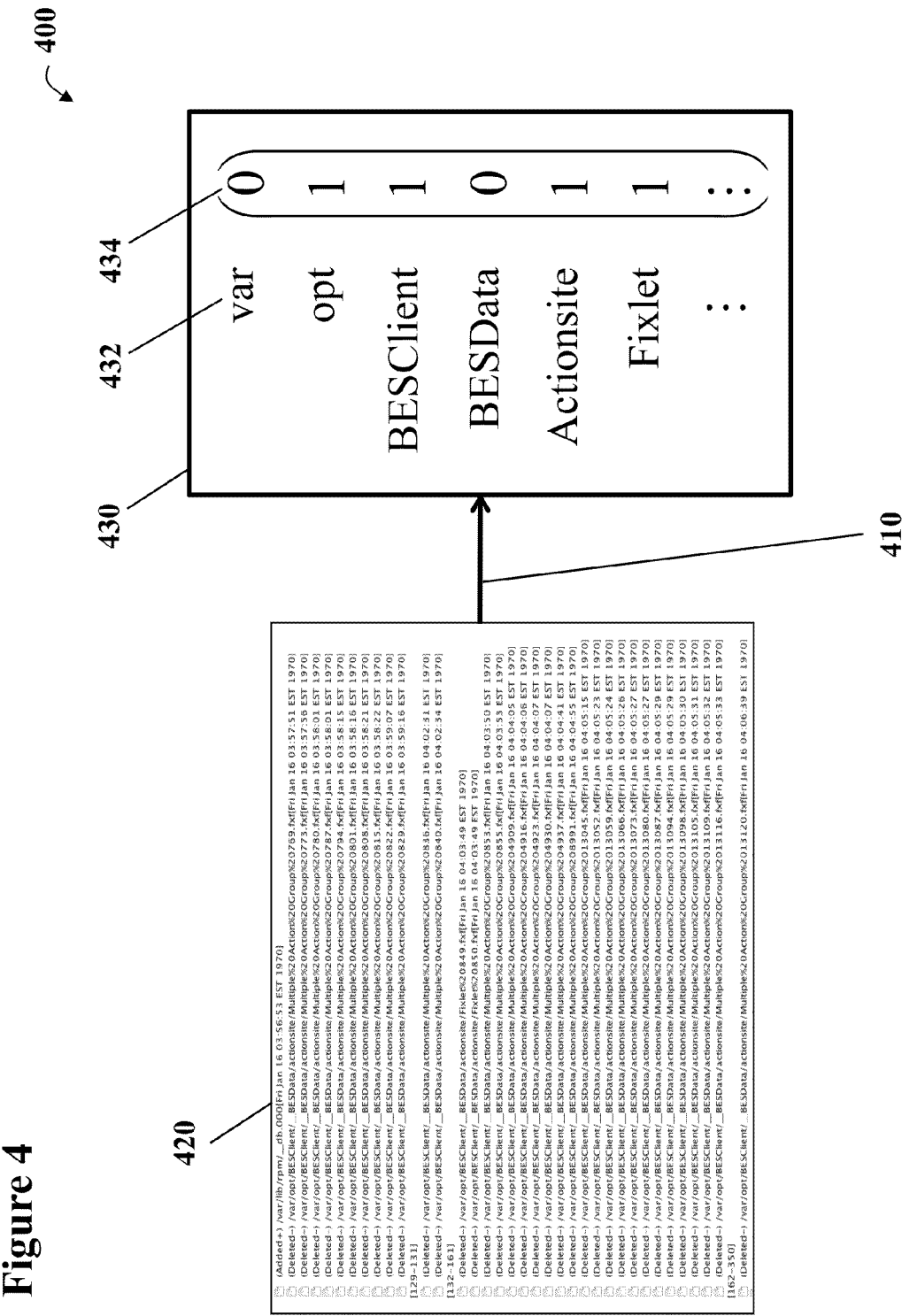
FIG. 4 shows an example transformation of a semantic diff into a structured (feature vector) format according to embodiments of the invention.

Referring now to FIG. 4, a transformation 400 according to embodiments of the claimed invention is shown. As illustrated, a portion of a semantic diff 420 has been computed. It should be pointed out that semantic diff 420 includes a number of elements listed linguistically that indicate differences between captured states 210*b* and 210*c* (FIG. 2). This semantic diff is then transformed 410 by semantic diff transformation module 146 (FIG. 1) into a feature vector format, illustrated herein in a vector space model 430. As illustrated, vector space model 430 includes a component designator 432, which designates which component is being referenced, regardless of the naming conventions of the particular semantic diff 420 used as input. In addition, vector space model 430 includes a component presence flag 434 that indicates whether the component indicated by the component designator 432 is present in the particular semantic diff 420.

Referring now to FIGS. 1 and 4 concurrently, structural diff analyzer module 148, as executed by computer system 102, can analyze the transformed semantic diff (which can be referred to as a structural diff), such as vector space model 430, to determine a remediation for an update-related failure. For example, vector space model 430 of the transformed semantic diff for a number of semantic diffs can be stored in a database, such as storage system 118. Then, a vector space model 430 from a newly computed and transformed semantic diff can be compared with the stored vector space models 430. The non-linguistic transformed semantic diff can allow this comparison to be made via a calculation that obtains a numerical result indicative of the similarity between different semantic diffs. This calculation can take the form of the following equation:

$$sim(D_i, D_j) = \frac{\sum_k D_{ik} D_{jk}}{\sqrt{\sum_k D_{ik}^2} \sqrt{\sum_k D_{jk}^2}}.$$

In this equation, k is the attribute location within the vector space model. For example, in vector space model 430, k=2 would refer to the component having component designation of "opt". $D_i$, would be the newly transformed vector space model 430, and $D_j$ would be the stored vector space model 430 which is being compared for similarity against $D_i$. It should, however, be recognized by those skilled in the art that other methods for analyzing multiple structured data sets for similarity now known or later developed can be utilized for analysis purposes. For example, latent semantic analysis is a method that is able to perform dimension reduction and thereby find hidden semantics in high-dimensional vector space. These methods could vary based on such factors as the type of failure remediation being performed, the type of feature vector format into which the semantic diff is being transformed, a desired weighting of components in the structured format with respect to one another, etc.

Figure 5:
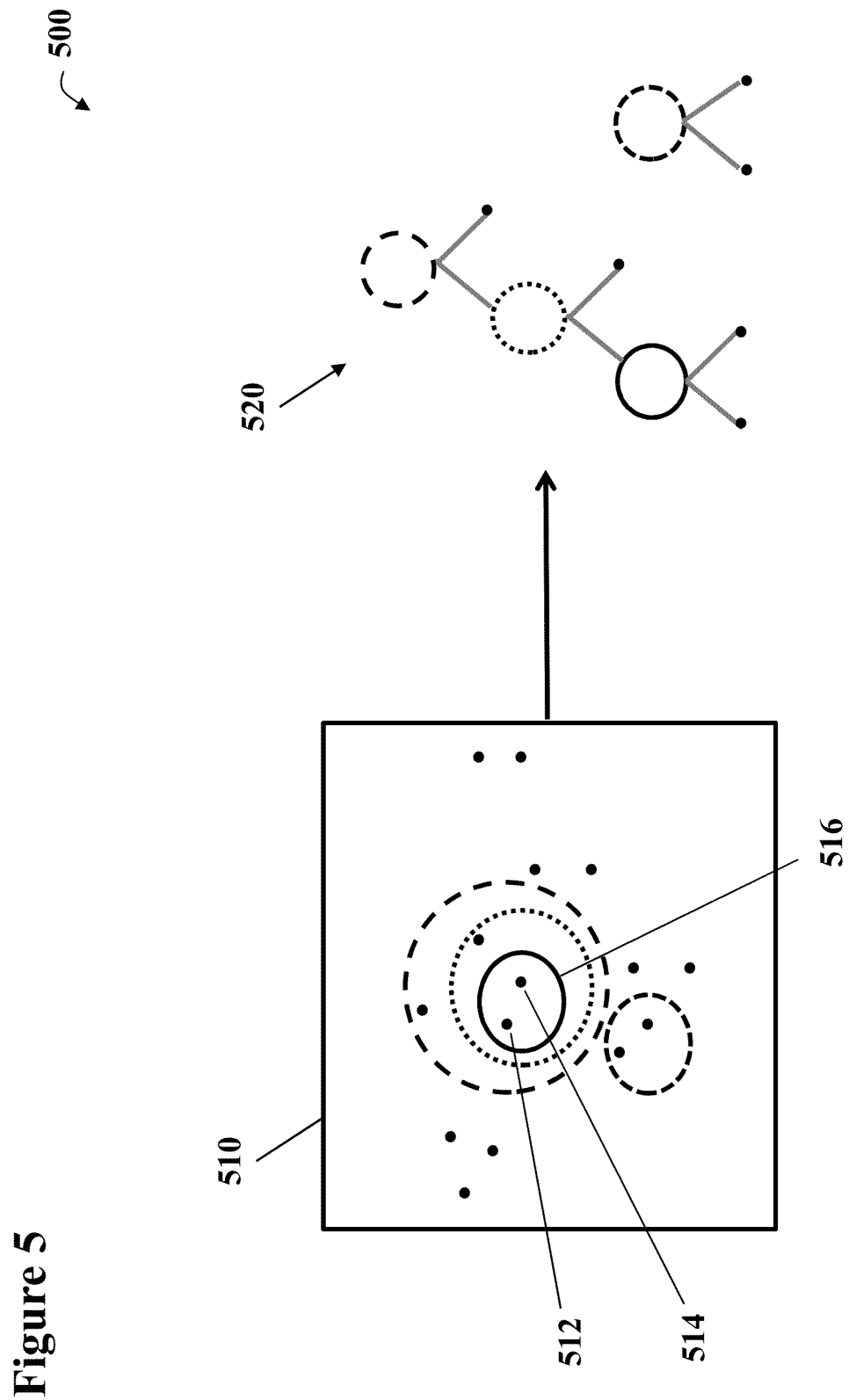
FIG. 5 shows example graphical representation used in diff analysis according to embodiments of the invention.

Referring now to FIG. 5, a graphical representation 500 that can be used to analyze a set of semantic diffs 320 (FIG. 3) according to embodiments of the invention is shown. As illustrated, a number of data points that represent semantic diffs have been represented as a graph 510. Assume that starting data point 512 represents a semantic diff that the user desires to compare against. Starting data point 512 can be associated 516 with a next proximate data point 514 that is associated with a previously computed semantic diff. This associating of the starting data point can be repeatedly performed with each of a series of next proximate previously semantic diffs on the graph 510, as illustrated by the larger circles illustrating the associations. These associations can also be represented with respect to the semantic diff in a tree format.

These associations can be used to identify patterns of similarity with regard to the semantic diff. Similarities discovered using associations, such as these, can allow a user 120 to compare failures for analysis purposes. For example, a group of similar semantic diffs could point to a common source of failure. This information could be used in conjunction with a captured state and annotations 212 (FIG. 2), describing the operation that precipitated the failure, to construct a failure signature that represents a particular failure scenario. This analysis can also be used to perform failure pattern matching, to predict failures in similar future operations, etc. For example, if the configuration before an update is similar enough to one of the previously encountered configurations, then the analysis can predict the set of likely failures based on the semantic diffs the model is trained on. In addition, the information could be used in conjunction with a stored annotation 214 (FIG. 2), describing the processes used to resolve the failure, to construct a resolution signature, etc. This resolution signature could be used to resolve future failures, providing a resolution knowledge base. This could be achieved in a manner that is similar to using failure patterns to predict possible failures. Once the set of failures is predicted, the corresponding set of resolutions can also be suggested.

Figure 6:
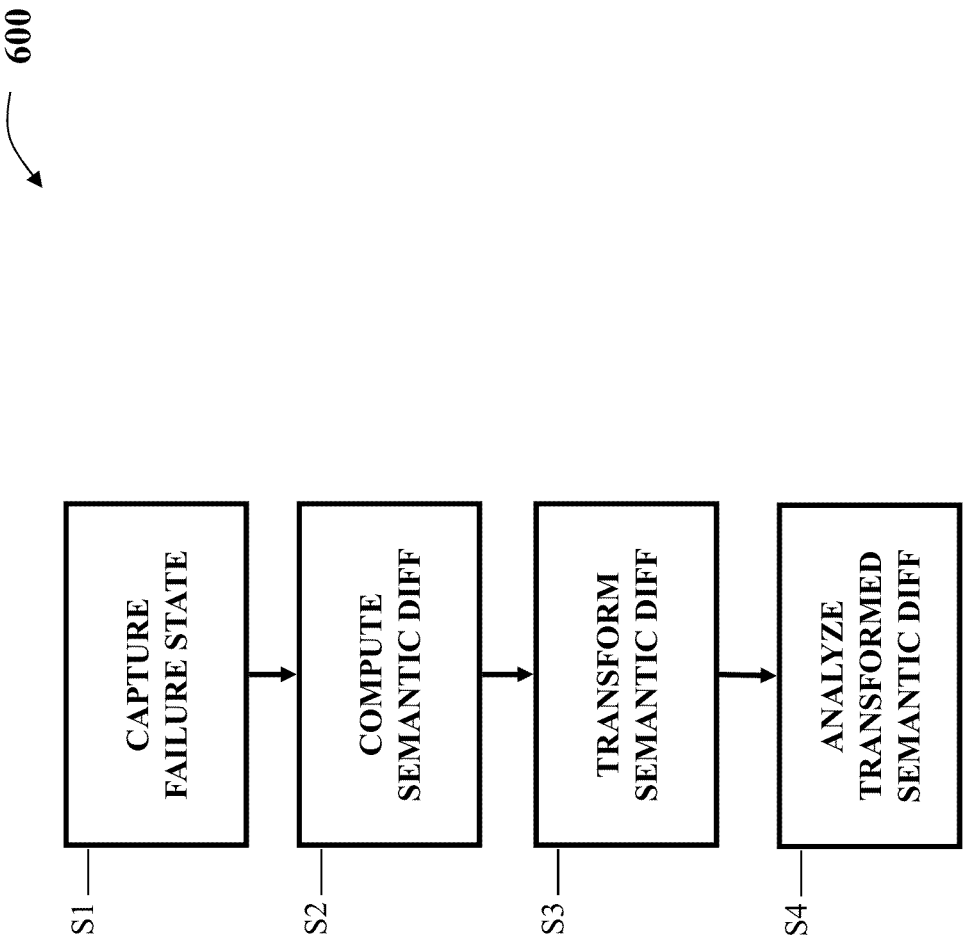
FIG. 6 shows an example flow diagram according to embodiments of the invention.

Turning now to FIG. 6, an example flow diagram according to embodiments of the invention is shown. As illustrated in FIG. 6 in conjunction with FIG. 1, in S1, failure state capture module 142, as executed by computer system 102, captures a failure state 210*b* (FIG. 2) of a computer system arrived at as a result of an update-related failure. In S2, semantic diff computer module 144, as executed by computer system 102, computes a semantic diff 154. Semantic diff 154 is the difference between captured state 210*b* (FIG. 2) of failure stage 202*b* (FIG. 2) and one of captured state 210*c* (FIG. 2) of completion stage (FIG. 2) or captured state 210*a* (FIG. 2) of initial stage (FIG. 2). In S3, semantic diff transformation module 146, as executed by computer system 102, transforms the semantic diff 154 into a structured format. This format could include a vector space model 430 (FIG. 4) or any other like structure. In S4, structural diff analyzer module 148, as executed by computer system 102, analyzes and compares the transformed semantic diff 154 to determine a remediation for an update-related failure.

While shown and described herein as a method and system for remediating an update-related failure, it is understood that aspects of the invention further provide various alternative embodiments. For example, in one embodiment, the invention provides a computer program fixed in at least one computer-readable medium, which when executed, enables a computer system to remediate an update-related failure. To this extent, the computer-readable medium includes program code, such as failure remediation program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as failure remediation program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for remediating an update-related failure. In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for remediating an update-related failure, comprising at least one computer device that performs a method, comprising:
capturing a failure state of a computer system arrived at as a result of the update-related failure;
computing a semantic diff, the semantic diff being a difference between the failure state and at least one of an original state or a completion state;
transforming the semantic diff into a feature vector format; and
analyzing the transformed semantic diff to determine a remediation for the update-related failure;
constructing a signature for at least one of failures or resolutions, where a signature comprises a semantic diff and a context.

2. The system of claim 1, wherein the failure state includes contextual data that includes at least one of: the captured state of the system before the update was performed or a description of an operation that preceded the update-related failure or an annotation describing a resolution of the update-related failure.

3. The system of claim 2, wherein the operation includes at least one of: a modification to an operating system of the computer system, modification to an application of the computer system, modification of a management agent in the computer system, modification of settings of any software or hardware component of the computer system, or a modification to communications parameters for the computer system.

4. The system of claim 1, wherein the feature vector format includes a vector space model.

5. The system of claim 4, the analyzing further comprising:
accessing a stored vector space model that represents a previously computed semantic diff; and
calculating a similarity between the vector space model and the stored vector space model using the following:

$$sim(D_i, D_j) = \frac{\sum_k D_{ik} D_{jk}}{\sqrt{\sum_k D_{ik}^2} \sqrt{\sum_k D_{jk}^2}},$$

where:
k is an attribute location within the vector space model,
$D_i$, is the vector space model, and
$D_j$ is the stored vector space model.

6. The system of claim 1, the analyzing further comprising:
computing the similarity between a given semantic diff and a plurality of previously computed structural diffs;
associating the semantic diff with a most proximate previously computed semantic diff;
repeatedly associating the semantic diff with a each of a series of next proximate previously semantic diffs; and
representing the associations with respect to the semantic diff in tree form.

7. The system of claim 1, the analyzing further comprising using a generative model on the semantic diff to derive essential features of the semantic diff that led to the update-related failure.

8. The system of claim 1, the analyzing further comprising:
comparing the semantic diff with a plurality of previously computed semantic diffs; and
determining at least one matching semantic diff from the previously computed semantic diffs based on the comparison;
retrieving a resolution annotation from the at least one matching semantic diff; and
resolving the migration-related failure based on the resolution annotation.

9. The system of claim 1, wherein the update-based failure occurs as a result of a migration from a server to a cloud-based virtual server.

10. The system of claim 1, further comprising:
constructing the signature by comparing at least one of failures or resolutions; and
analyzing the signature by comparing the signature with a set of failures and resolutions;
wherein the signature includes both the semantic diff and a context that includes at least one of: a captured state, or annotations, or operations performed.

11. A computer program product stored on a computer readable storage medium, which, when executed performs a method for remediating an update-related failure, comprising:
capturing a failure state of a computer system arrived at as a result of the update;
computing a semantic diff, the semantic diff being a difference between the failure state and at least one of an original state or a completion state;
transforming the semantic diff into a feature vector format;
analyzing the transformed semantic diff to determine a remediation for the failure;
constructing a signature for the failure state with at least one of a source of failure for the failure state, a captured failure state, and an annotation for the failure state, wherein the signature comprises a semantic diff and a context; and
computing a similarity between the computed semantic diff and a plurality of previously computed structural diffs for other computer systems, wherein each of the plurality of previously computed structural diffs includes an operation precipitating a failure of the respective other computer system.

12. The program product of claim 11, wherein the context includes at least one of: the captured state of the system before the update was performed, a description of an operation that preceded the update-related failure, and an annotation describing a resolution of the update-related failure.

13. The program product of claim 12, wherein the operation includes at least one of: a modification to an operating system of the computer system, modification to an application of the computer system, modification of a management agent in the computer system, modification of settings of any software or hardware component of the computer system, or a modification to communications parameters for the computer system.

14. The program product of claim 11, wherein the feature vector format includes a vector space model.

15. The program product of claim 14, the analyzing further comprising:
accessing a stored vector space model that represents a previously computed semantic diff; and
calculating a similarity between the vector space model and the stored vector space model using the following:

$$sim(D_i, D_j) = \frac{\sum_k D_{ik} D_{jk}}{\sqrt{\sum_k D_{ik}^2} \sqrt{\sum_k D_{jk}^2}},$$

where:
k is an attribute location within the vector space model,
$D_i$, is the vector space model, and
$D_j$ is the stored vector space model.

16. The program product of claim 11, the analyzing further comprising:
associating the semantic diff with a most proximate previously computed semantic diff;
repeatedly associating the semantic diff with a each of a series of next proximate previously semantic diffs; and
representing the associations with respect to the semantic diff in tree form.

17. The program product of claim 11, the analyzing further comprising using a generative model on the semantic diff to derive essential features of the semantic diff that led to the update-related failure.

18. The program product of claim 11, the analyzing further comprising:
comparing the semantic diff with a plurality of previously computed semantic diffs; and
determining at least one matching semantic diff from the previously computed semantic diffs based on the comparison;
retrieving a resolution annotation from the at least one matching semantic diff; and
resolving the migration-related failure based on the resolution annotation.

19. The program product of claim 11, wherein the update-based failure occurs as a result of a migration from a server to a cloud-based virtual server.

20. The program product of claim 11, further comprising:
constructing the signature by comparing at least one of failures or resolutions; and
analyzing the signature by comparing the signature with a set of failures and resolutions.

* * * * *